United States Patent
Tiwari et al.

(10) Patent No.: US 10,136,383 B2
(45) Date of Patent: Nov. 20, 2018

(54) DEVICE AND METHOD HANDLING A NETWORK SELECTION

(71) Applicant: HTC Corporation, Taoyuan (TW)

(72) Inventors: Kundan Tiwari, Taoyuan (TW); Chih-Hsiang Wu, Taoyuan (TW)

(73) Assignee: HTC Corporation, Taoyuan (TW)

(*) Notice: Subject to any disclaimer, the term of this patent is extended or adjusted under 35 U.S.C. 154(b) by 0 days.

(21) Appl. No.: 15/495,990

(22) Filed: Apr. 25, 2017

(65) Prior Publication Data
US 2017/0311234 A1 Oct. 26, 2017

Related U.S. Application Data

(60) Provisional application No. 62/327,400, filed on Apr. 25, 2016.

(51) Int. Cl.
*H04W 48/18* (2009.01)
*H04L 29/08* (2006.01)
(Continued)

(52) U.S. Cl.
CPC ............ *H04W 48/18* (2013.01); *H04L 67/12* (2013.01); *H04W 48/12* (2013.01); *H04W 84/042* (2013.01)

(58) Field of Classification Search
CPC ... H04W 4/005; H04W 72/042; H04W 76/02; H04W 72/0453; H04W 88/02; H04W 60/00; H04W 72/0413; H04W 52/0209; H04W 48/16; H04W 36/00; H04W 48/18; H04W 36/14; H04W 48/00; H04W 48/08; H04W 4/021; H04L 5/0055; H04L 5/0007;
(Continued)

(56) References Cited

U.S. PATENT DOCUMENTS

| 2008/0026766 A1* | 1/2008 | Shin ................ H04W 72/042 455/450 |
| 2011/0038372 A1* | 2/2011 | Wijayanathan ......... H04W 8/26 370/389 |

(Continued)

OTHER PUBLICATIONS

3GPP TS 23.401 V13.6.1 (Mar. 2016) Technical Specification 3rd Generation Partnership Project; Technical Specification Group Services and System Aspects; General Packet Radio Service (GPRS) enhancements for Evolved Universal Terrestrial Radio Access Network (E-UTRAN) access (Release 13).

(Continued)

*Primary Examiner* — Nimesh Patel
(74) *Attorney, Agent, or Firm* — Winston Hsu

(57) ABSTRACT

A communication device for handling a cell selection comprises a storage unit for storing instructions and a processing circuit coupled to the storage unit. The processing circuit is configured to execute the instructions stored in the storage unit. The instructions comprise receiving first system information from a first cell; determining whether the first cell supports a Cellular Internet of Thing (CIoT) feature according to the first system information; selecting a second cell which supports the CIoT feature according to second system information received from the second cell, if the first cell does not support the CIoT feature according to the first system information; and performing an attach procedure or a tracking area update procedure via the second cell.

15 Claims, 6 Drawing Sheets

(51) Int. Cl.
*H04W 48/12* (2009.01)
*H04W 84/04* (2009.01)

(58) Field of Classification Search
CPC ... H04L 5/0057; H04L 1/1812; H04L 1/0027; H04L 1/1887; H04L 5/006; H04L 12/189; H04L 25/0202; H04L 43/08; H04L 47/822
See application file for complete search history.

(56) References Cited

U.S. PATENT DOCUMENTS

| | | | |
|---|---|---|---|
| 2015/0163726 A1* | 6/2015 | Bansal | H04W 48/16 455/434 |
| 2015/0181506 A1* | 6/2015 | Ravuvari | H04W 8/183 455/434 |
| 2017/0201345 A1* | 7/2017 | Persson | H04L 1/0034 |
| 2017/0215197 A1* | 7/2017 | Sagong | H04W 72/085 |

OTHER PUBLICATIONS

3GPP TS 36.304 V13.1.0 (Mar. 2016) Technical Specification 3rd Generation Partnership Project; Technical Specification Group Radio Access Network; Evolved Universal Terrestrial Radio Access (E-UTRA); User Equipment (UE) procedures in idle mode (Release 13).

3GPP TSG SA WG2 Meeting #114 S2-162051 Sophia Antipolis, France, Apr. 11-15, 2016 CR-Form-v11.1 Change Request 23.401 CR 3015 rev 4 Current version: 13.6.1.

3GPP TS 23.122 V13.4.0 (Mar. 2016-03) Technical Specification 3rd Generation Partnership Project; Technical Specification Group Core Network and Terminals; Non-Access-Stratum (NAS) functions related to Mobile Station (MS) in idle mode (Release 13).

* cited by examiner

US 10,136,383 B2

DEVICE AND METHOD HANDLING A NETWORK SELECTION

CROSS REFERENCE TO RELATED APPLICATIONS

This application claims the benefit of U.S. Provisional Application No. 62/327,400 filed on Apr. 25, 2016, which is incorporated herein by reference.

BACKGROUND OF THE INVENTION

1. Field of the Invention

The present invention relates to a device and a method used in a wireless communication system, and more particularly, to a device and a method of handling a network selection.

2. Description of the Prior Art

A long-term evolution (LTE) system provides high data rate, low latency, packet optimization, and improved system capacity and improved coverage. The LTE system is evolved continuously to increase peak data rate and throughput by using advanced techniques, such as carrier aggregation (CA), dual connectivity, licensed-assisted access, etc. In the LTE system, a radio access network known as an evolved universal terrestrial radio access network (E-UTRAN) includes at least one evolved Node-B (eNB) for communicating with at least one user equipment (UE), and for communicating with a core network. The core network may include a mobility management and a Quality of Service (QoS) control of the at least one UE.

A UE may support one or more Cellular Internet of Thing (CIoT) features. In one example, the UE only supports a CIoT feature which is not supported by an eNB. If the UE camps on a cell of the eNB according to a cell selection criteria, the UE is not able to get a service via the cell. In addition, one or more public land mobile networks (PLMNs) may be displayed in a UE after performing a PLMN search. A user may select one of the PLMNs which is not supported by the UE. Accordingly, the UE is not able to get a service via the selected PLMN.

SUMMARY OF THE INVENTION

The present invention therefore provides a communication device and method for handling a network selection to solve the abovementioned problem.

A communication device for handling a cell selection comprises a storage unit for storing instructions and a processing circuit coupled to the storage unit. The processing circuit is configured to execute the instructions stored in the storage unit. The instructions comprise receiving first system information from a first cell; determining whether the first cell supports a Cellular Internet of Thing (CIoT) feature according to the first system information; selecting a second cell which supports the CIoT feature according to second system information received from the second cell, if the first cell does not support the CIoT feature according to the first system information; and performing an attach procedure or a tracking area update procedure via the second cell.

A communication device for handling a public land mobile network (PLMN) selection comprises a storage unit for storing instructions and a processing circuit coupled to the storage unit. The processing circuit is configured to execute the instructions stored in the storage unit. The instructions comprise performing a manual PLMN search; obtaining a first PLMN which supports a CIoT feature and a second PLMN which does not support the CIoT feature in response to the manual PLMN search; and displaying the first PLMN and not displaying the second PLMN on a display device of the communication device.

A communication device for handling a public land mobile network (PLMN) selection comprises a storage unit for storing instructions and a processing circuit coupled to the storage unit. The processing circuit is configured to execute the instructions stored in the storage unit. The instructions comprise performing a manual PLMN search; and indicating a plurality of available PLMNs and a plurality of Cellular Internet of Thing (CIoT) features corresponding to the plurality of available PLMNs in response to the manual PLMN search.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
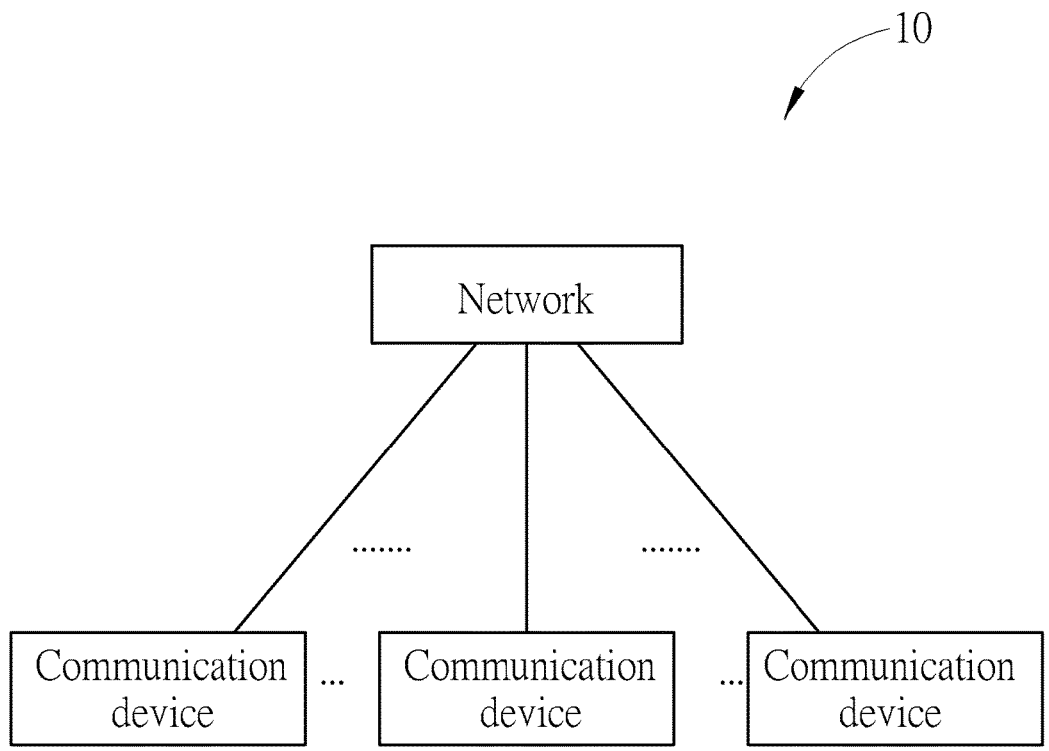
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via multiple cells (e.g., multiple carriers) including a primary cell (PCell) and one or more secondary cells (SCells). The abovementioned cells may be operated in the same or different frame structure types, or in the same or different duplexing modes, i.e. frequency-division duplexing (FDD) and time-division duplexing (TDD). For example, the PCell may be operated on a licensed carrier, while the SCell may be operated on an unlicensed carrier.

In FIG. 1, the network and the communication devices are simply utilized for illustrating the structure of the wireless communication system 10. Practically, the network may be a narrowband (NB) internet of things (IoT) network or an evolved universal terrestrial radio access network (E-UTRAN) including at least one evolved Node-B (eNB). The network may be a fifth generation (5G) network including at least one 5G base station (BS) which employs orthogonal frequency-division multiplexing (OFDM) and/or non-OFDM and a transmission time interval (TTI) shorter than 1 ms (e.g. 100 or 200 microseconds), to communicate with the communication devices. In general, a BS may also be used to refer any of the eNB and the 5G BS.

Furthermore, the network may also include the GERAN/UTRAN/E-UTRAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. The GERAN is an abbreviation of Global System for Mobile Communications (GSM) Enhanced Data rates for GSM Evolution (EDGE) Radio Access Network. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device may be a user equipment (UE), a machine type communication (MTC) device, a mobile phone, a laptop, a tablet computer, an electronic book, a portable computer system, a vehicle, or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
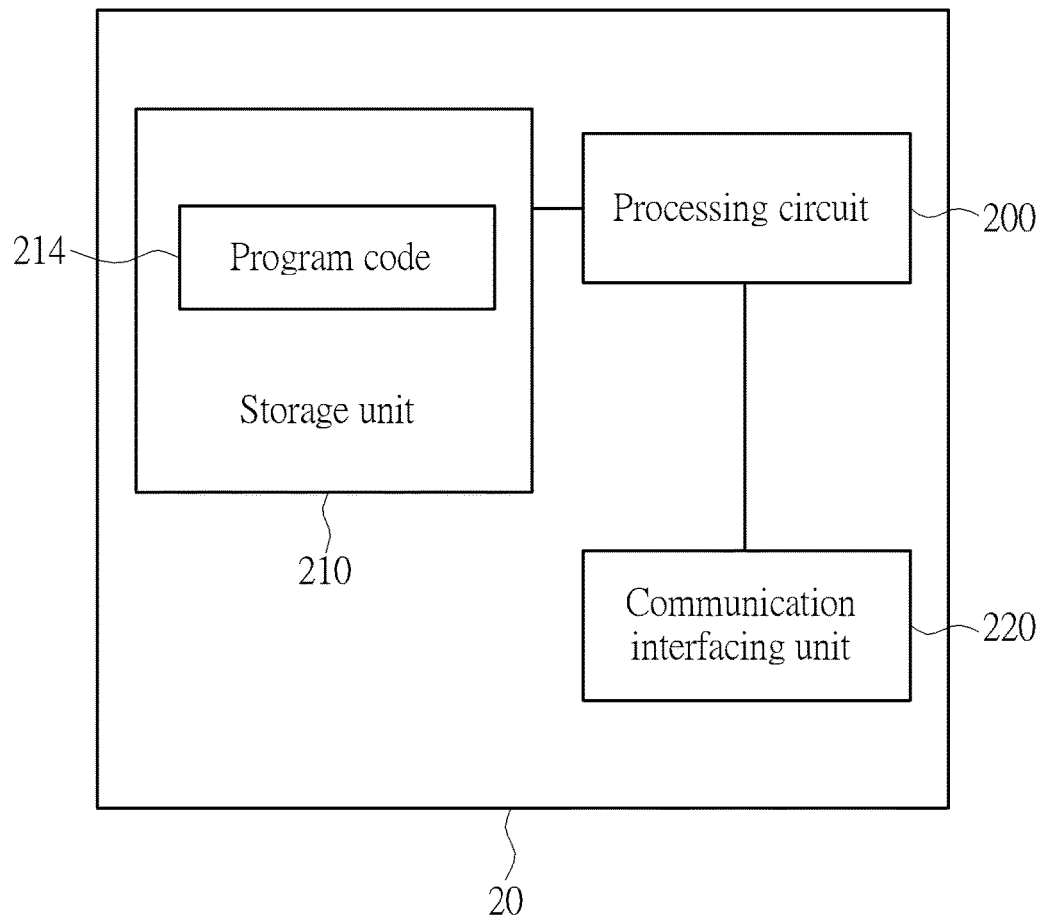
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing circuit 200.

In the following embodiments, a UE is used to represent a communication device in FIG. 1, to simplify the illustration of the embodiments.

Figure 3:
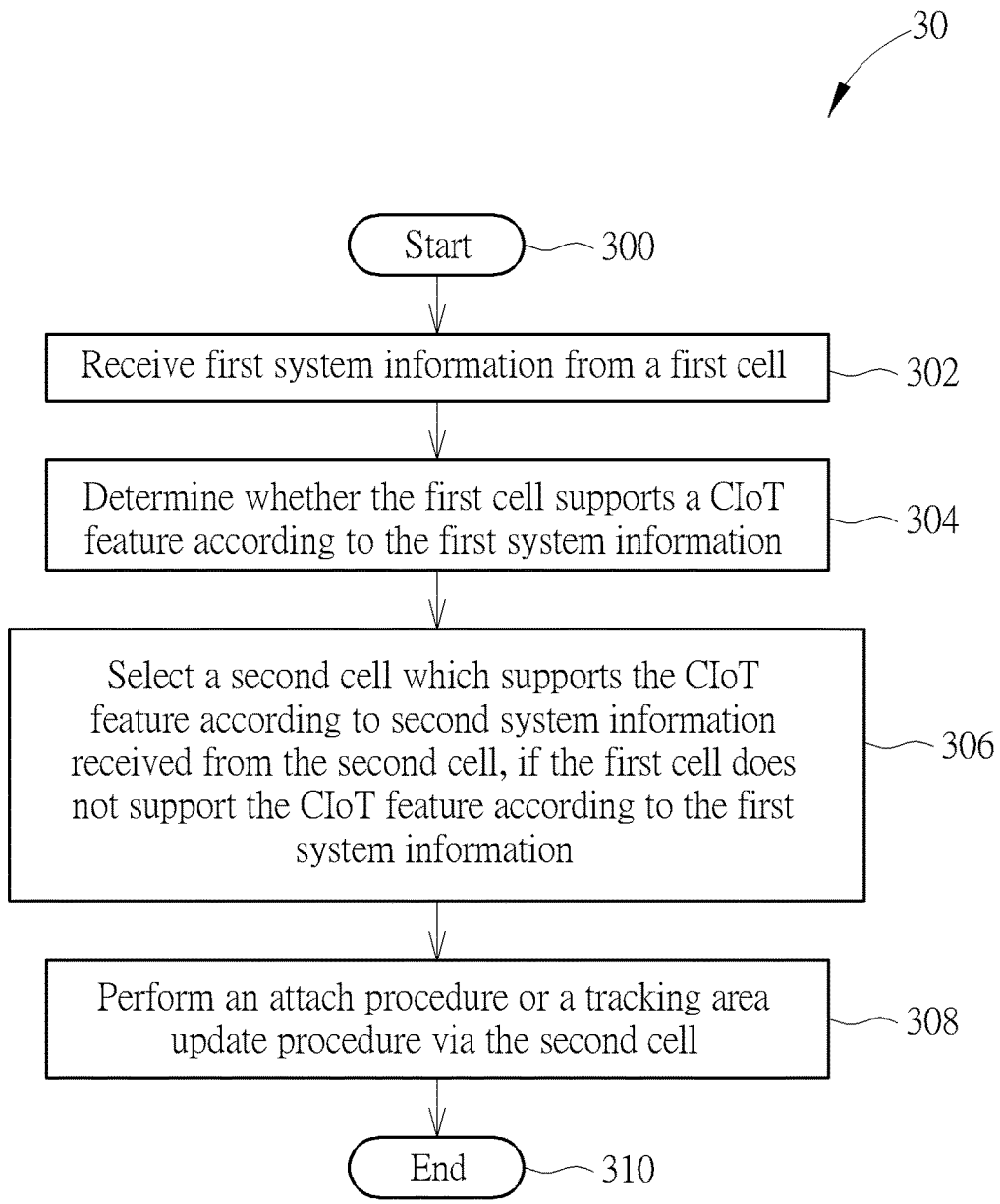
FIG. 3 is a flowchart of a process according to an example of the present invention.

FIG. 3 is a flowchart of a process 30 according to an example of the present invention. The process 30 is utilized in a UE, to handle a cell selection. The process 30 includes the following steps:

Step 300: Start.

Step 302: Receive first system information from a first cell.

Step 304: Determine whether the first cell supports a Cellular Internet of Thing (CIoT) feature according to the first system information.

Step 306: Select a second cell which supports the CIoT feature according to second system information received from the second cell, if the first cell does not support the CIoT feature according to the first system information.

Step 308: Perform an attach procedure or a tracking area update procedure via the second cell.

Step 310: End.

According to the process 30, the UE receives first system information from a first cell, and determines whether the first cell supports a CIoT feature according to the first system information. Then, the UE selects a second cell which supports the CIoT feature according to second system information received from the second cell, if the first cell does not support the CIoT feature according to the first system information. Accordingly, the UE performs an attach procedure or a tracking area update procedure via the second cell. That is, the UE knows whether a selected cell supports a CIoT feature or not according to system information received from the selected cell. The UE continues to search for a cell (e.g., performs a cell selection) which supports the CIoT. Thus, the UE is able to receive service(s) via the second cell.

Realization of the process 30 is not limited to the above description. An example of the cell selection is described as follows.

A UE supporting a CIoT feature selects a first cell of a first network, and receives first system information broadcasted by the first network on the first cell. The first system information indicates that the first cell does not support the CIoT feature. Accordingly, the UE knows that the first cell does not support the CIoT feature. The UE may search a second cell at a same carrier frequency as that of the first cell or at a different carrier frequency from that of the first cell. When the UE finds the second cell, the UE receives second system information broadcasted on the second cell. If the second system information indicates that the second cell supports the CIoT feature, the UE selects the second cell and transmits an attach request message or a tracking area update request message on the second cell. In one example, the second cell belongs to the first network (e.g., public land mobile network (PLMN)). In one example, the second cell belongs to a second network (e.g., PLMN) which is different from the first network. The first cell and the second cell may belong to a same BS or different BS.

In one example, the UE may further receive the second system information from the second cell, and may determine whether the second cell supports the CIoT feature according to the second system information.

In one example, the CIoT feature may include a Control Plane (CP) CIoT evolved packet system (EPS) optimization, a User Plane (UP) CIoT EPS optimization, an attach without packet data network (PDN) connectivity and/or a short message service (SMS) transfer without combined attach. In one example, the UE may only support the attach without PDN connectivity, the first cell does not support the attach without PDN connectivity, and the second cell supports the attach without PDN connectivity. In another example, the UE may only support the Control Plane CIoT EPS optimization, the first cell does not support the Control Plane CIoT EPS optimization, and the second cell supports the Control Plane CIoT EPS optimization.

In one example, the first cell may be a Narrowband-IoT cell or a wideband-Universal Terrestrial Radio Access Network (WB-E-UTRAN) cell. Similarly, the second cell may be a Narrowband-IoT cell or a WB-E-UTRAN cell. The UE may find the second cell but the second cell does not support the CIoT feature. If the UE does not find any cell which supports the CIoT feature and the UE supports another radio access technology such as GSM and/or universal mobile telecommunication system (UMTS), the UE may search a cell of a GSM network or a UMTS network. If the UE finds the cell, the UE selects the cell and transmits an attach request message, a location area update request message or a routing area update request message on the cell to the GSM network or the UMTS network. In one example, support of a CIoT feature may be sent in the System Information Block Type2 for WB-E-UTRAN cell or System Information Block Type1-NB for Narrowband-IoT cell.

In one example, the second cell may be a suitable cell (e.g., defined in the 3rd Generation Partnership Project (3GPP) standard). The UE may select a suitable cell, if the UE supports only a specific CIoT feature but the first cell does not support the specific CIoT feature.

Figure 4:
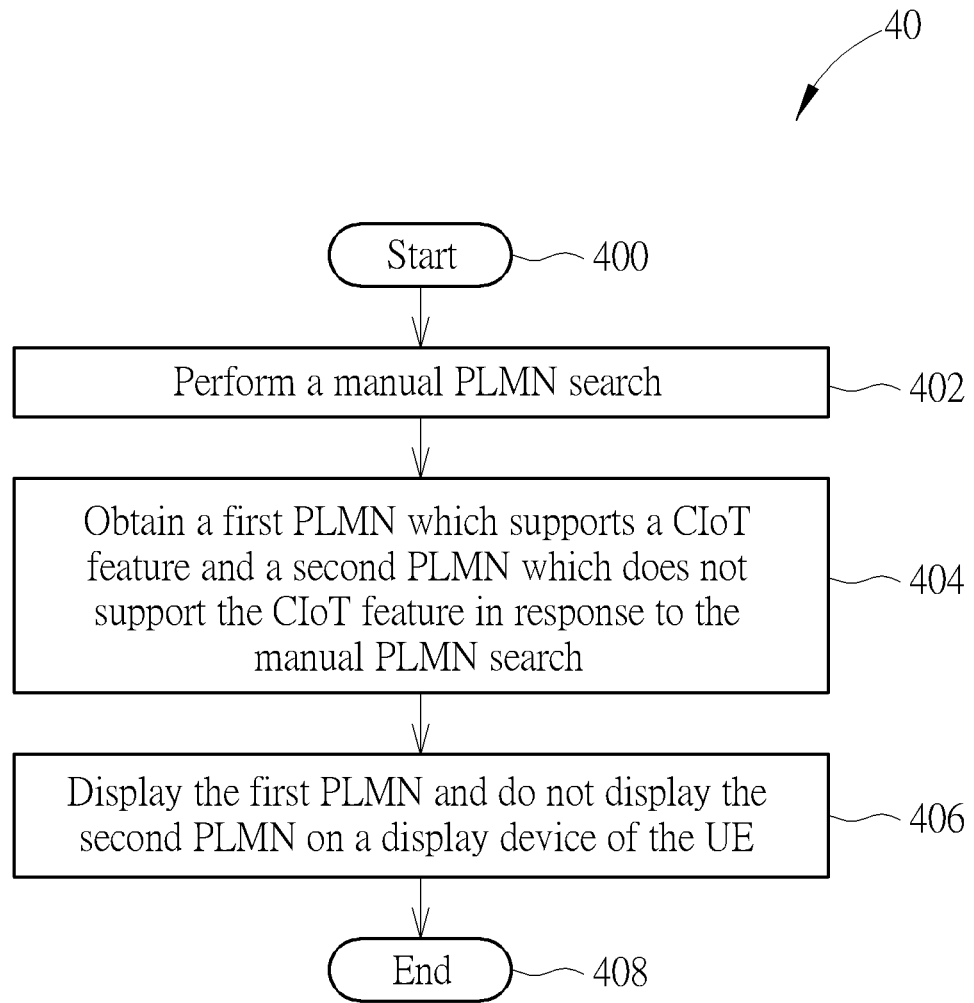
FIG. 4 is a flowchart of a process according to an example of the present invention.

FIG. 4 is a flowchart of a process 40 according to an example of the present invention. The process 40 is utilized in a UE, to handle a PLMN selection. The process 40 includes the following steps:

Step 400: Start.

Step 402: Perform a manual PLMN search.

Step 404: Obtain a first PLMN which supports a CIoT feature and a second PLMN which does not support the CIoT feature in response to the manual PLMN search.

Step 406: Display the first PLMN and do not display the second PLMN on a display device of the UE.

Step 408: End.

According to the process 40, the UE performs a manual PLMN search. The UE obtains (e.g., finds) a first PLMN which supports a CIoT feature and a second PLMN which does not support the CIoT feature in response to the manual PLMN search. Then, the UE displays the first PLMN and does not displaying the second PLMN on a display device (e.g., screen) of the UE. That is, only an obtained PLMN supporting a specific CIoT (e.g., supported by the UE) is shown on the UE, such that only the PLMN supporting the specific CIoT may be selected by a user. Thus, the problem that the user may select a PLMN not supporting the specific CIoT is solved.

Realization of the process 40 is not limited to the above description. An example of the cell selection is described as follows.

A UE only supports a CP CIoT EPS optimization, and does not support a UP CIoT EPS optimization. The UE performs a manual PLMN search, and finds PLMNs PLMN1-PLMN3, wherein the PLMN PLMN1 supports the CP CIoT EPS optimization and the PLMNs PLMN2-PLMN3 do not support the CP CIoT EPS optimization. Accordingly, the UE displays the PLMN PLMN1 on a display device of the UE, and does not display the PLMNs PLMN2-PLMN3 on the display device.

In one example, the UE performs the manual PLMN search as follows. The UE scans a plurality of radio frequencies (e.g., all available radio frequencies) according to a plurality of supported access technologies to obtain a scanning result. Then, the UE obtains the first PLMN and the second PLMN according to the scanning result.

In one example, the CIoT feature may include a CP CIoT EPS optimization, a UP CIoT EPS optimization, an attach without PDN connectivity and/or a SMS transfer without combined attach.

In one example, the UE may include a terminal equipment (e.g., user interface) for performing the manual PLMN search, and the UE further performs an attach procedure or a tracking area updating procedure on the first PLMN. In one example, the UE may include a Mobile Terminal (MT), and the MT indicates the first PLMN to the terminal equipment. In one example, support of a CIoT feature may be sent in the System Information Block Type2 for WB-E-UTRAN cell or System Information Block Type1-NB for Narrowband-IoT cell.

Figure 5:
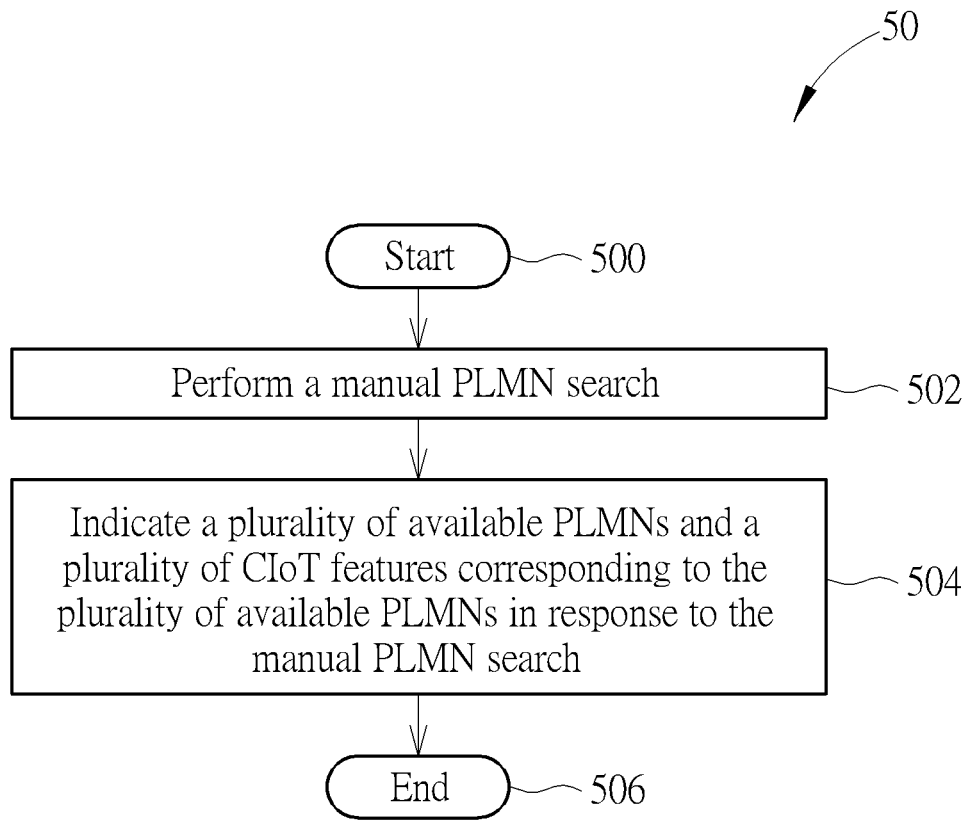
FIG. 5 is a flowchart of a process according to an example of the present invention.

FIG. 5 is a flowchart of a process 50 according to an example of the present invention. The process 50 is utilized in a UE, to handle a PLMN selection. The process 50 includes the following steps:

Step 500: Start.

Step 502: Perform a manual PLMN search.

Step 504: Indicate a plurality of available PLMNs and a plurality of CIoT features corresponding to the plurality of available PLMNs in response to the manual PLMN search.

Step 506: End.

According to the process 50, the UE performs a manual PLMN search. Then, the UE indicates a plurality of available PLMNs and a plurality of CIoT features corresponding to the plurality of available PLMNs in response to the manual PLMN search. That is, both available PLMN(s) and corresponding CLOT feature(s) are indicated. Thus, the UE can display more information regarding the available PLMNs on a display device (e.g., screen) of the UE to a user, and a better PLMN selection can be performed.

Realization of the process 50 is not limited to the above description. An example of the cell selection is described as follows.

In one example, the UE performs the manual PLMN search as follows. The UE scans a plurality of radio frequencies according to a plurality of supported access technologies to obtain a scanning result. Then, the UE obtains the plurality of available PLMNs according to the scanning result.

In one example, the CIoT feature may include a CP CIoT EPS optimization, a UP CIoT EPS optimization, an attach without PDN connectivity and/or a SMS transfer without combined attach.

In one example, the UE may include a terminal equipment (e.g., user interface) for performing the manual PLMN search, and the UE further performs an attach procedure or a tracking area updating procedure on one of the plurality of available PLMNs. In one example, the UE may include a MT, and the MT indicates the one of the plurality of available PLMNs to the terminal equipment. In one example, support of a CIoT feature may be sent in the System Information Block Type2 for WB-E-UTRAN cell or System Information Block Type1-NB for Narrowband-IoT cell.

Figure 6:
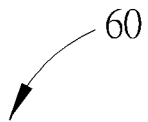
FIG. 6 is a table of PLMNs with corresponding CIoT features according to an example of the present invention.

FIG. 6 is a table 60 of PLMNs with corresponding CIoT features according to an example of the present invention. The table 60 may be a result of a manual PLMN search performed by a UE, and is displayed to a user. As shown in the table 60, there are two PLMNs PLMN1-PLMN2. The PLMN PLMN1 supports a CP CIoT EPS optimization, while the PLMN PLMN2 does not. "CP CIoT EPS optimization supported" and "CP CIoT EPS optimization not supported" are arranged corresponding to the PLMNs PLMN1-PLMN2, respectively. Thus, the user can select a PLMN according to the table 60.

In one example, the UE may select a PLMN from the plurality of available PLMNs, e.g., triggered by a command from a user. Then, the UE may indicate a failure on a display device (e.g., screen) of the UE, when the UE determines that the PLMN does not support a CIoT feature supported by the UE.

In one example, a UE performs a manual PLMN search, and finds a cell of a first PLMN in response to the manual PLMN search. The UE displays the first PLMN on a screen of the UE. If a user selects the first PLMN and the UE determines that the first PLMN does not support a CIoT feature supported by the UE, the UE indicates a failure on the screen to the user. For example, the UE determines that the first PLMN does not support the CIoT feature according to system information broadcasted on the cell by a BS of the cell. Then, the UE does not transmit any message to the base station in response to the selection of the first PLMN, since the UE knows that the cell or the BS does not support the CIoT feature.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for handling a network selection. A communication device can select a cell or a PLMN properly according to CIoT feature(s) supported by the communication device and/or CIoT feature(s) supported by the cell or the PLMN. The problem that a cell or a PLMN is selected erroneously is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A communication device for handling a cell selection, comprising:
a storage unit, for storing instructions of:
receiving first system information from a first cell;
determining whether the first cell supports a Cellular Internet of Thing (CIoT) feature according to the first system information, wherein the CIoT feature comprises a Control Plane (CP) CIoT evolved packet system (EPS) optimization, a User Plane (UP) CIoT EPS optimization, an attach without packet data network (PDN) connectivity and/or a short message service (SMS) transfer without combined attach;
selecting a second cell which supports the CIoT feature according to second system information received from the second cell, if the first cell does not support the CIoT feature according to the first system information; and
performing an attach procedure or a tracking area update procedure via the second cell; and
a processing circuit, coupled to the storage unit, configured to execute the instructions stored in the storage unit.
2. The communication device of claim 1, wherein the storage unit further stores the instructions of:
receiving the second system information from the second cell; and
determining whether the second cell supports the CIoT feature according to the second system information.
3. The communication device of claim 1, wherein the communication device only supports the attach without PDN connectivity, and the first cell does not support the attach without PDN connectivity.
4. The communication device of claim 1, wherein at least one of the first cell and the second cell is a Narrowband-IoT cell or a wideband-Universal Terrestrial Radio Access Network (WB-E-UTRAN) cell.
5. The communication device of claim 1, wherein the first cell belongs to a first network, and the second cell belongs to a second network.
6. The communication device of claim 1, wherein the second cell is a suitable cell.
7. A communication device for handling a public land mobile network (PLMN) selection, comprising:
a storage unit, for storing instructions of:
performing a manual PLMN search;
obtaining a first PLMN which supports a CIoT feature and a second PLMN which does not support the CIoT feature in response to the manual PLMN search, wherein the CIoT feature comprises a Control Plane (CP) CIoT evolved packet system (EPS) optimization, a User Plane (UP) CIoT EPS optimization, an attach without packet data network (PDN) connectivity and/or a short message service (SMS) transfer without combined attach; and
displaying the first PLMN and not displaying the second PLMN on a display device of the communication device in response to the manual PLMN search; and
a processing circuit, coupled to the storage unit, configured to execute the instructions stored in the storage unit.
8. The communication device of claim 7, wherein the instruction of performing the manual PLMN search comprises:
scanning a plurality of radio frequencies according to a plurality of supported access technologies to obtain a scanning result; and
obtaining the first PLMN and the second PLMN according to the scanning result.
9. The communication device of claim 7, wherein the communication device comprises a terminal equipment for performing the manual PLMN search, and the storage unit further stores the instruction of:
performing an attach procedure or a tracking area updating procedure on the first PLMN.
10. The communication device of claim 9, wherein the communication device comprises a Mobile Terminal (MT), and the storage unit further stores the instruction of:
the MT indicating the first PLMN to the terminal equipment.
11. A communication device for handling a public land mobile network (PLMN) selection, comprising:
a storage unit, for storing instructions of:
performing a manual PLMN search; and
displaying a plurality of available PLMNs and a plurality of Cellular Internet of Thing (CIoT) features corresponding to the plurality of available PLMNs in response to the manual PLMN search, wherein the plurality of CIoT features comprises a Control Plane (CP) CIoT evolved packet system (EPS) optimization, a User Plane (UP) CIoT EPS optimization, an attach without packet data network (PDN) connectivity and/or a short message service (SMS) transfer without combined attach; and a processing circuit, coupled to the storage unit, configured to execute the instructions stored in the storage unit.

12. The communication device of claim 11, wherein the instruction of performing the manual PLMN search comprises:

scanning a plurality of radio frequencies according to a plurality of supported access technologies to obtain a scanning result; and obtaining the plurality of available PLMNs according to the scanning result.

13. The communication device of claim 11, wherein the communication device comprises a terminal equipment for performing the manual PLMN search, and the storage unit further stores the instruction of:

performing an attach procedure or a tracking area updating procedure on one of the plurality of available PLMNs.

14. The communication device of claim 13, wherein the communication device comprises a Mobile Terminal (MT), and the storage unit further stores the instruction of:

the MT indicating the one of the plurality of available PLMNs to the terminal equipment.

15. The communication device of claim 11, wherein the storage unit further stores the instruction of:

selecting a PLMN from the plurality of available PLMNs; and indicating a failure on a display device of the communication device, when the communication device determines that the PLMN does not support a CIoT feature supported by the communication device.

* * * * *